Sept. 5, 1967   D. M. LITTLE ETAL   3,340,185
PURIFICATION OF SULFUR DIOXIDE SOLVENT
Filed March 21, 1966   4 Sheets-Sheet 1

INVENTORS
D.M. LITTLE
G.R. HETTICK
BY
ATTORNEYS

INVENTORS
D.M. LITTLE
G.R. HETTICK

BY

ATTORNEYS

INVENTORS
D.M. LITTLE
G.R. HETTICK

BY

*Young, Gregg*

ATTORNEYS

United States Patent Office 3,340,185
Patented Sept. 5, 1967

3,340,185
PURIFICATION OF SULFUR DIOXIDE SOLVENT
Donald M. Little and George R. Hettick, Bartlesville, Okla., assignors to Phillips Petroleum Company, a corporation of Delaware
Filed Mar. 21, 1966, Ser. No. 536,141
11 Claims. (Cl. 208—321)

This invention relates to a process for the selective extraction of hydrocarbon compounds with sulfur dioxide. More particularly, this invention relates to a method for the recovery of the sulfur dioxide solvent employed in such processes. Still more specifically, this invention provides for a method of purifying sulfur dioxide solvents used in the hydrocarbon extraction systems by removing the sulfur dioxide from the extract phase and subjecting it to extractive distillation in the presence of sulfolane.

In one aspect, this invention relates to the purification and recovery of sulfur dioxide by extractive distillation in the presence of sulfolane. In another aspect, this invention relates to a method of effectively separating mixtures of sulfur dioxide, water and hydrocarbon by subjecting the same to extractive distillation in the presence of sulfolane. In yet another aspect, this invention relates to a method for extracting mixtures of sulfur dioxide, hydrocarbon oil and water with sulfolane and subsequent recovery and reuse of the sulfolane.

The method of this invention has particular application to the treatment of petroleum fractions for the production of lubricating oils. Such processes generally consist of continually contacting liquid sulfur dioxide with petroleum fractions containing unsaturated, aromatic, sulfur containing, saturated, and carbon residue producing constituents wherein the sulfur dioxide is a selective solvent for all of these constituents extent for the saturated hydrocarbons. As a result, on approaching equilibrium, two phases are produced of which one, generally referred to as raffinate phase, consists primarily of saturated hydrocarbons and only a small amount of dissolved sulfur dioxide. The second, generally more dense, phase referred to as the extract phase contains the bulk of the sulfur dioxide solvent in an addition to the aromatic, unsaturated, and sulfur containing constituents of the feed. The refined raffinate phase is continuously removed from the extraction zone and further processed to yield saturated hydrocarbons suitable for application as lubricating oils. The extract phase can be continuously removed from the bottom of the extraction zone and further treated to a closed cycle to recover sulfur dioxide of purity sufficient to allow its reuse in the extraction zone without unduly contaminating the extraction zone through the recycle of impurities with the sulfur dioxide stream.

Heretofore, the problem of effective purification of the sulfur dioxide before it is recycled without excessive loss of the solvent in its purification system has been a consideration of primary concern. The removal of sulfur dioxide from the relatively high boiling extracted oils is complicated by temperature limitations imposed by the reaction of sulfur dioxide with the extract oil at temperatures sufficiently high to remove the sulfur dioxide from the oils even under high vacuum. This problem of removing the substantial amount of the dissolved sulfur dioxide from the bulk of the extract oils has been obviated to some extent by the multiple fractionation of the extract phase in serial fractionating zones as disclosed in U.S. Patent 2,905,638, G. R. Hettick. In order to achieve an economically feasible recovery of the sulfur dioxide solvent, however, it is necessary to separate from the extract phase along with the sulfur dioxide a substantial amount of the water present therein as well as the extract hydrocarbons. As a result, the problem remains of effectively separating the resultant mixture of sulfur dioxide, water and hydrocarbon to allow the substantial removal of water from the system and further to allow the efficient recovery of sulfur dioxide of high purity for reuse in the extraction zone.

It is, therefore, one object of this invention to provide an efficient process for the removal of sulfur dioxide solvent from the extract phase in high purities.

It is another object of this invention to provide a method for efficiently separating mixtures of sulfur dioxide, water and extract hydrocarbon to yield substantial recovery of the sulfur dioxide and in high purity and an extract oil product substantially free of water.

Yet another object of this invention is the provision of a process for drying a mixture comprising sulfur dioxide, water and hydrocarbon to yield sulfur dioxide and hydrocarbons substantially free of water.

Other aspects, objects and advantages of the process of this invention will be obvious to one skilled in the art from the following disclosure and the appended claims.

Generally, the process of this invention comprises contacting mixtures of sulfur dioxide and either water or extract hydrocarbon oil or both in an extractive distillation zone at conditions sufficient to produce an overhead product comprising primarily sulfur dioxide, and subsequently treating a second fraction produced in said extractive distillation zone, which fraction contains the bulk of sulfolane solvent, in another fractionation zone at conditions sufficient to produce substantial separation of water and sulfolane wherein at least part of the water produced as overhead product in said fractionation zone is removed from the system.

Particularly, the process of this invention provides for the separation of mixtures of sulfur dioxide and either water or extract hydrocarbon or both derived by fractionation from the extract phase produced in the liquid-liquid extraction of petroleum fractions with liquid sulfur dioxide by contacting said mixtures with sulfolane in an extractive distillation zone, recycling the purified sulfur dioxide produced therein for reuse in the aforesaid hydrocarbon extraction zone and further fractionating a second stream from said extractive distillation zone which stream comprises the bulk of the sulfolane in a subsequent fractionation zone at conditions sufficient to produce an overhead product therefrom comprising primarily water and a bottoms product comprising the bulk of the sulfolane, which concentrated sulfolane stream is recycled to the aforesaid extractive distillation column for reuse as selective solvent in the purification of sulfur dioxide therein.

More specifically, in one embodiment of this invention, a mixture of sulfur dioxide, water and extract oil is introduced into an extractive distillation column comprising several vertically spaced serial stages at an intermediate point of said stages wherein said mixture is contacted with sulfolane to produce purified sulfur dioxide as an overhead product, a bottoms product comprising the primarily mixed extract oil, and an intermediate product comprising the bulk of the sulfolane and water in the system. The sulfolane-water mixture is then passed to a subsequent fractionation zone comprising several vertically spaced serial stages wherein the mixture is either distilled or steam stripped to remove essentially pure water as an overhead product and concentrated sulfolane as a bottoms product. This concentrated sulfolane stream, comprising a small amount of water, is recycled to the extractive distillation zone wherein it is reused as a selective solvent therein.

In another embodiment, the mixture of sulfur dioxide, water and oil can be admixed with an amount of water and sulfolane sufficient to produce a two-phase mixture. This mixture is then passed to a quiescent settling zone wherein the phases separate to yield the less dense upper phase consisting primarily of extract hydrocarbon oil and more dense lower phase comprising sulfur dioxide, water and sulfolane. A more dense phase is then passed to an extractive distillation column wherein the mixture is contacted with additional sulfolane introduced at the top of the column. The extractive distillation column is operated at conditions that will produce an overhead product comprising purified sulfur dioxide and a bottoms product containing the bulk of the sulfolane and water in the system along with only a trace of sulfur dioxide. This bottoms stream is then passed to a sulfolane stripping column wherein the sulfolane and water are separated to produce water as an overhead product and concentrated sulfolane as a bottoms product. At least a part of the sulfolane from the sulfolane stripper is recycled to the extractive distillation column and the remainder of the concentrated sulfolane can be recycled into admixture with the feed to the system.

Each of the aforegoing embodiments is particularly adaptable to the previously described hydrocarbon extraction processes wherein sulfur dioxide is employed as the selected solvent. In such extraction processes, the extract phase produced can be fractionated to remove more volatile constituents such as sulfur dioxide and water from the higher boiling hydrocarbon oils. At least a part of the volatile constituents removed as overhead can be treated for the separation of sulfur dioxide from the water therein by fractionating the mixture in a drying column and removing purified sulfur dioxide as an overhead product. This purified sulfur dioxide is recycled to the hydrocarbon extraction zone and the bottoms product comprising sulfur dioxide, water and some extract hydrocarbon can be employed as the feed mixture through the process of this invention as described in two embodiments set forth hereinabove.

However, it is within the scope of this invention to provide yet another specific embodiment of the process of this invention. In this embodiment the overhead product from the extract phase fractionation zone is passed directly to the extractive distillation zone wherein it is contacted with sulfolane which acts as a selective solvent for the water and extract hydrocarbon in the mixture. This extractive distillation zone comprises several vertically spaced serial stages and is operated at conditions sufficient to effect substantial separation of the sulfur dioxide from sulfolane, water and extract oil. The purified sulfur dioxide can be recycled to the hydrocarbon extraction zone, and the bottoms product from the extractive distillation column comprising extract hydrocarbon, water and sulfolane can be passed to a sulfolane stripping zone. The sulfolane stripping zone also comprising several vertically spaced serial stages is operated at conditions sufficient to achieve substantial separation of sulfolane from the more volatile water and extract hydrocarbons. The concentrated sulfolane produced therein can be recycled to the aforesaid extractive distillation column for further use as the selective solvent therein.

The process of this invention is particularly adaptable to mixtures of sulfur dioxide, water and extract hydrocarbon such as those obtained as overhead distillates by the fractionation of the extract phase from recycle oil liquid-liquid extraction systems employing liquid sulfur dioxide as a selective solvent. However, although the specific embodiments of this invention are hereinafter described primarily in reference to such extraction systems, this mode of presentation is intended only to be illustrative of the application of the process of this invention and is in no way intended to limit the scope of that application.

Figure 1:
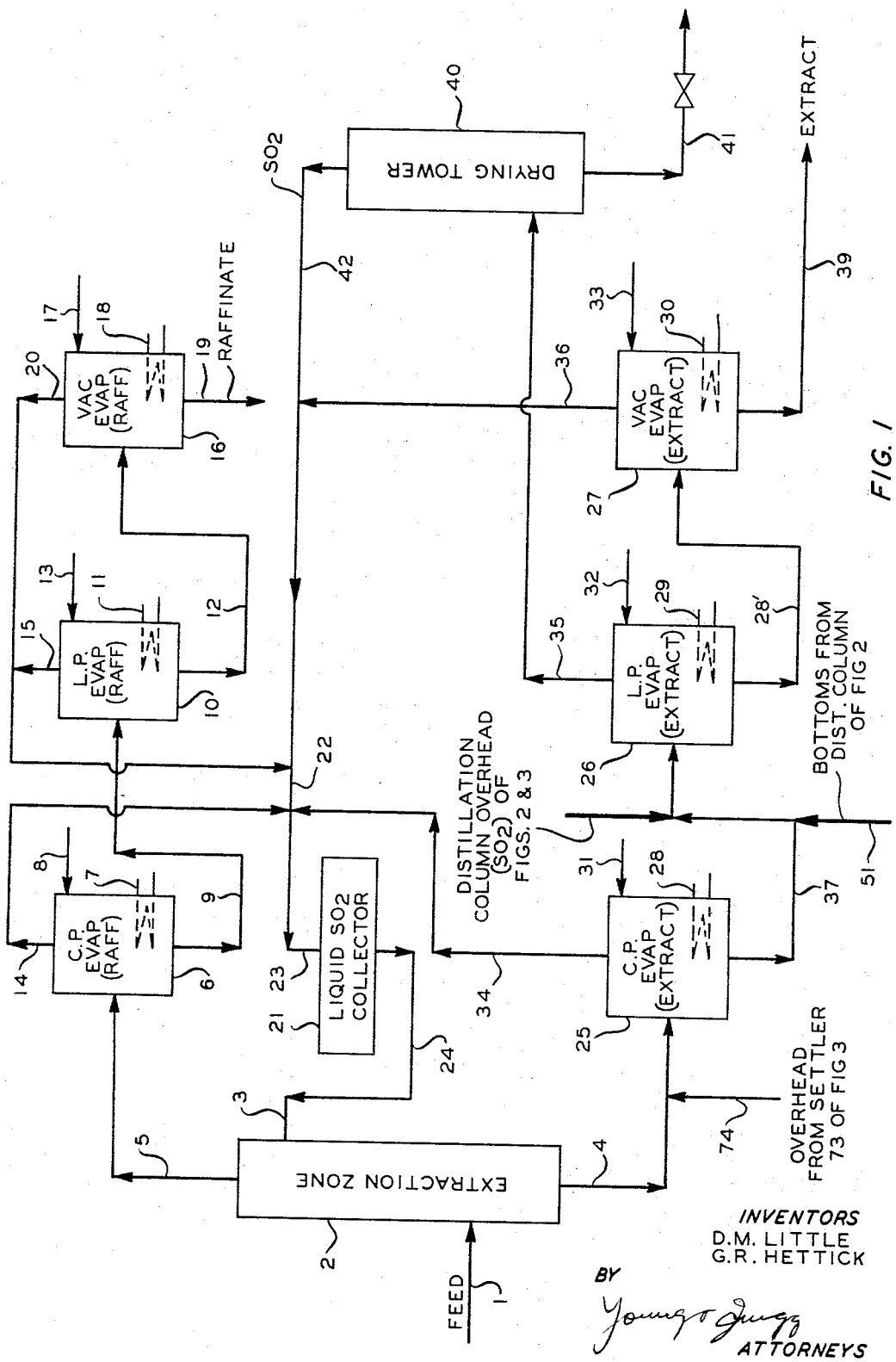
FIGURE 1 shows in schematic form a petroleum fraction selective extraction zone and primary product and a solvent recovery system.

Referring now to the drawings, in FIGURE 1 a recycle oil comprising aromatic saturated and unsaturated recycle oil stocks and a small amount of entrained and dissolved water is introduced through line 1 to an extraction column 2 at an intermediate point to which column is also added liquid sulfur dioxide through line 3. The extraction conditions as regards solvent-oil ratios, tower throughput, temperature, etc., are well understood by those skilled in the liquid sulfur dioxide extraction art; and these conditions therefore will not be herein detailed for purposes of brevity. Extract phase is removed from the extraction zone through a pipe 4 while the raffinate phase is removed from the top of the extraction zone through pipe 5. The raffinate phase is introduced into a condenser pressure evaporator 6 through pipe 5 which evaporator is maintained at about 100 pounds per square inch gauge pressure. Heat for sulfur dioxide removal in the evaporator is applied by heater 7 with reflux being provided through pipe 8 as desired. Bottoms oil still containing solution sulfur dioxide is passed through pipe 9 and to a second low pressure evaporator 10 maintained at about 5 pounds per square inch gauge pressure. Heat for the removal of sulfur dioxide in this evaporator is supplied by heater 11, the evaporator being refluxed by liquid through pipe 13 as desired. Bottoms oil containing only a small concentration of sulfur dioxide is passed through pipe 12 into a vacuum evaporator 16 maintained in an absolute pressure of about 100 millimeters of mercury. Sufficient heat is provided from a heater 18 to maintain the temperature of the oil in this evaporator below about 300° F. with reflux being provided from pipe 17 as desired. Purified raffinate oil is removed from the vacuum evaporator through line 19 and passed to subsequent refining operations. Overhead product from each evaporator comprising primarily sulfur dioxide is passed through lines 14, 15, 20, 22 and 23 to be combined and collected in liquid collector 21 from which is subsequently recycled through line 24 and 3 to the extraction zone.

As previously described, the extract phase is removed from the bottom of the extraction zone 2 and passed through pipe 4 into a first evaporator 25. In this evaporator heat for reboiling is provided by heater 28 and pressure therein maintained at about 100 pounds per square inch gauge for removal of the major portion of the sulfur dioxide. This sulfur dioxide stream is removed as overhead through pipe 34 and passed to liquid collector 21 to be recycled to the extraction zone. Reflux to the evaporator can be provided as desired through pipe 31. Extract oil with an appreciable amount of remaining sulfur dioxide is removed through pipe 37 as bottoms product of the first evaporator stage and is passed to a second evaporator 26 which in this embodiment is maintained at a pressure of about 5 pounds per square inch gauge with heat for evaporation of sulfur dioxide being supplied by heater 29. The overhead product from the second evaporation stage is removed by pipe 35 and, in this embodiment, is passed to drying tower 40. This overhead product comprises sulfur dioxide, lower boiling hydrocarbon constituents, and the major amount of water present in the hydrocarbon extract phase. Reflux for the second evaporator can be provided through pipe 32 and bottoms product containing only a small amount of solution sulfur dioxide can be removed through pipe 28' and passed to a vacuum evaporator 27. In this example, this vacuum evaporator is operated at an absolute pressure of about 100 millimeters of mercury, is supplied with heat as desired by heater 30 and is refluxed as desired through pipe 33. Overhead product is removed from the vacuum evaporator through pipe 36 and combined with sulfur dioxide leaving drying tower 40 as overhead product through pipe 42 and the combined streams are passed through lines 22 and 23 to liquid collector 21. Refined extract oil is removed as bottoms product from the vacuum evaporator through pipe 39 and passed to further processing as desired.

The drying tower 40, in this embodiment, can comprise several vertically spaced serial fractionation stages that serve to separate the mixture of sulfur dioxide, water and hydrocarbon fed into an intermediate point of the drying tower into an overhead product comprising primarily sulfur dioxide and a bottoms product comprising hydrocarbon, water and dissolved sulfur dioxide. The bottoms product is removed through pipe 41 and, in the two alternate embodiments of this invention shown in FIGURES 2 and 3, is further processed for purification of the sulfur dioxide remaining therein and substantial separation of the water and hydrocarbon.

Figure 2:
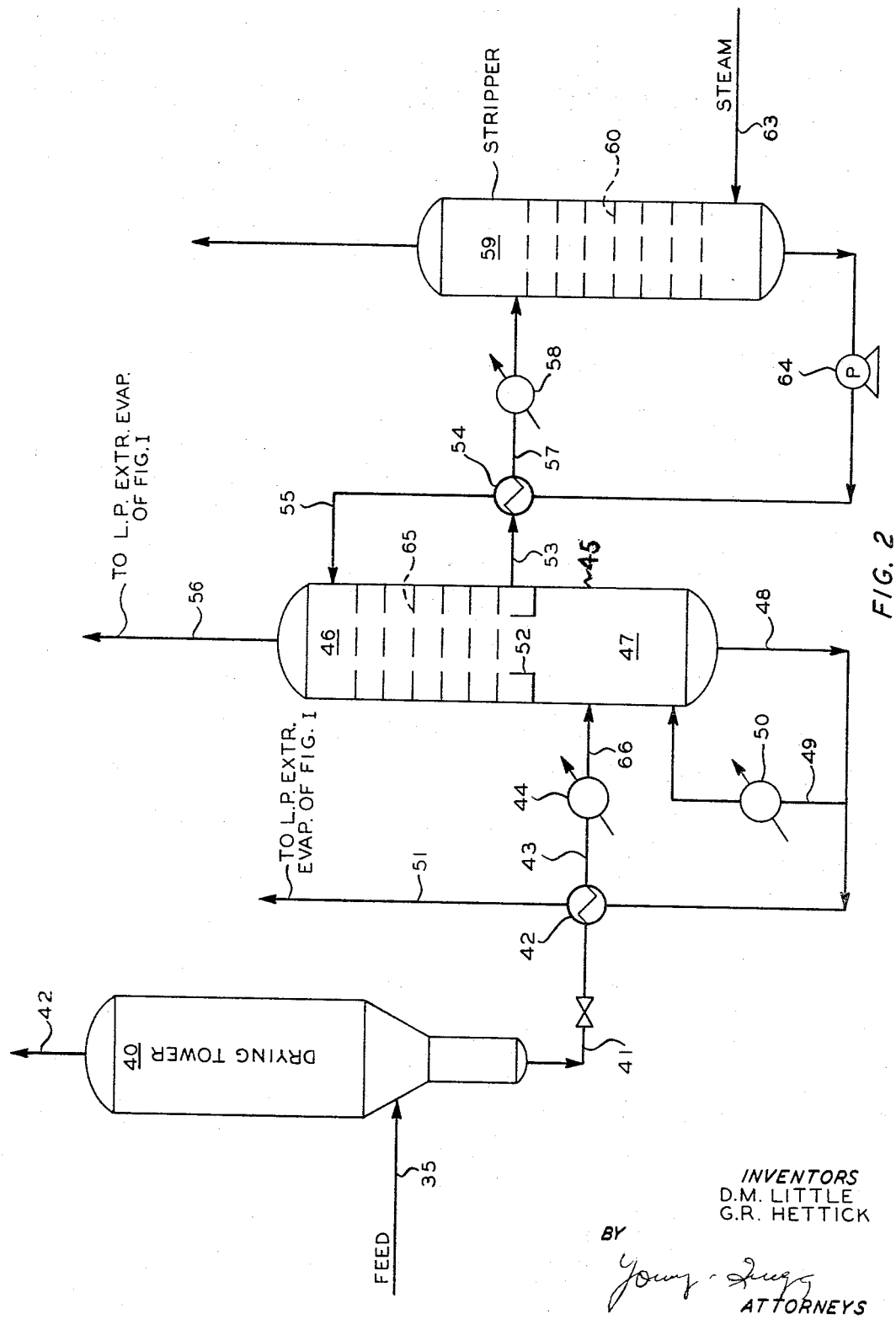
FIGURE 2 shows in schematic form one preferred embodiment of this invention having an extractive distillation zone for the recovery of the primary sulfur dioxide solvent and extract oil and a secondary solvent (sulfolane) recovery zone in closed cycle therewith.
Figure 3:
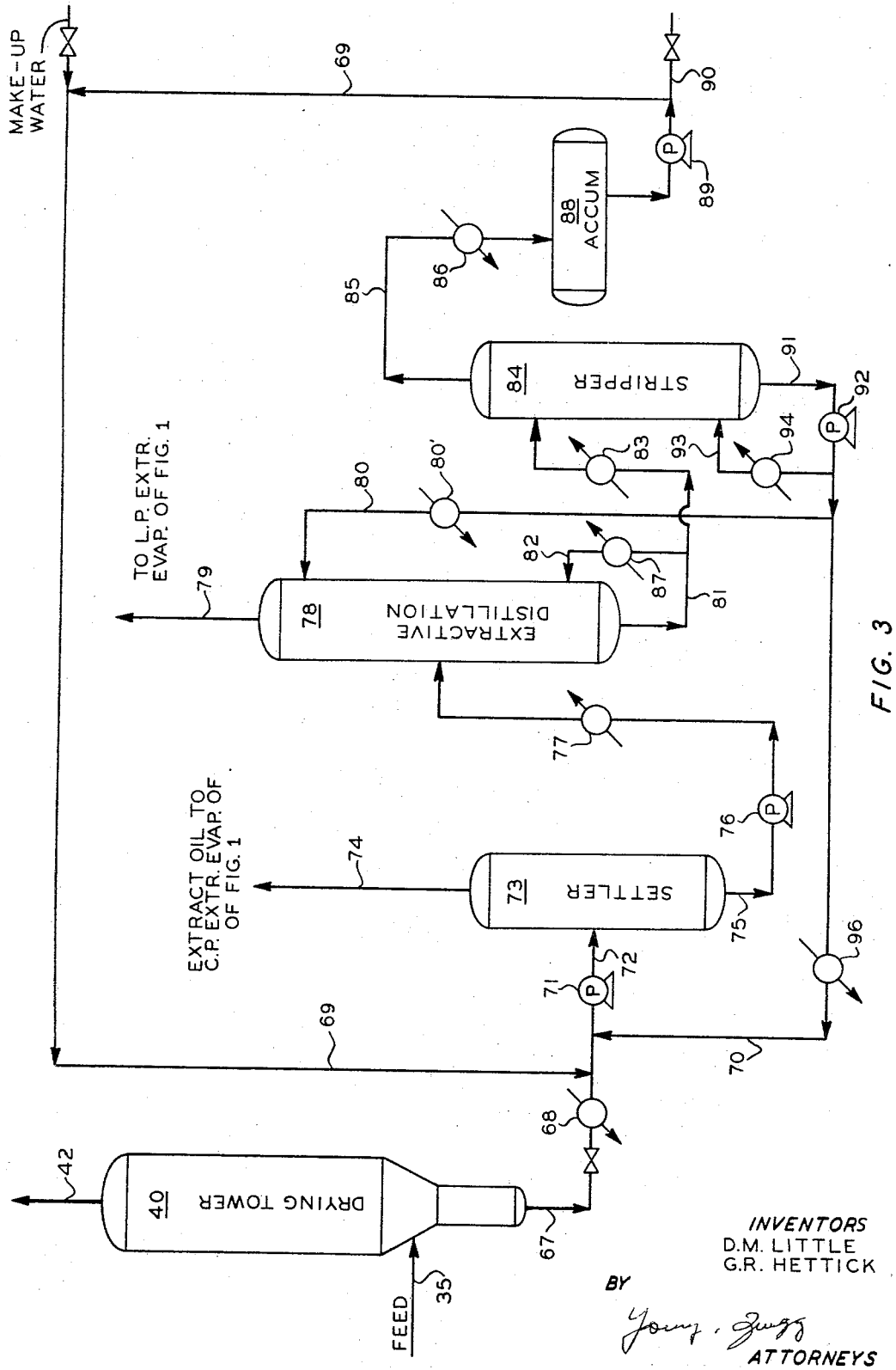
FIGURE 3 shows schematically another embodiment of this invention comprising a settling zone, a primary solvent recovery zone, and a secondary solvent recovery zone in closed cycle therewith.

As shown in FIGURE 2, bottoms product is removed from drying tower 40 at conditions of about 180 pounds per square inch absolute and 190° F. through line 41 and passed to heat exchanger 42, line 43 and heater 44 and is introduced to the extractive distillation column 45 through pipe 66. The extractive distillation zone of this particular embodiment can comprise several vertically spaced serial stages 65 arranged in an upper zone 46 and a lower zone 47. However, the nature of this extractive distillation zone is not necessarily that described, but rather can comprise any apparatus that will accomplish the function desired. The selective solvent sulfolane is introduced at the uppermost stage of the extractive distillation zone through line 55. Overhead product comprising primarily sulfur dioxide and preferably less than 1 mol percent water is removed as overhead through pipe 56 and charged to the extract low pressure extract evaporator, while the bottoms product comprising primarily extract oil yet having entrained therein some water and sulfur dioxide is removed through line 48 and passed by way of heat exchanger 42 and pipe 51 as recycle to the intermediate extract evaporator of FIGURE 1. Part of this bottoms product can be recycled to the lower stage of the extractive distillation column via pipe 49 and reheater 50 to provide heat to the column as desired.

The water and sulfolane in this extractive distillation column concentrate at an intermediate point therein, 52, and are removed by way of pipe 53, heat exchanger 54 and pipe 57, heater 58, and are passed to an upper stage of sulfolane stripper 59. The removal of this intermediate product stream from the extractive distillation column provides for removal of substantially all of the sulfolane and water from the system. The sulfolane stripping column which can comprise a series of several vertically spaced serial stages 60 is operated at conditions which effect the separation of water from the sulfolane. For example, the temperature at the lower stage of the sulfolane stripped can be maintained at about 370° F. by the introduction of steam at that point through pipe 63. The pressure at the outlet of the upper stage of the sulfolane stripper is maintained at approximately one atmosphere. Such operation provides for the separation of an overhead product comprising essentially water with preferably less than 1 mol percent sulfur dioxide through pipe 61 and removal of a bottoms product comprising predominantly sulfolane which is recycled to the uppermost stage of the extractive distillation column through pump 64 and pipe 55.

The process of this embodiment as described results in a substantial improvement in the degree of recovery of both the sulfur dioxide and extract oil removed as bottoms product from the drying column 40. At the same time, the purity of the sulfur dioxide stream removed as overhead from the extractive distillation column is of such purity that it may be recycled directly without further processing to the hydrocarbon extraction zone (low pressure extract evaporator) shown in FIGURE 1. Consequently, this method of operation provides for the effective separation of the two valuable constituents of the bottoms product from the drying column and their recycle in a most effective manner for reuse in the extraction operation while preventing the recycle of any significant amount of water that is known to interfere with the effectiveness of the extraction operation.

As an illustrative example of the degree of separation accomplished by this mode of operation, the bottoms product from the drying column 40 can comprise about 35 mol percent sulfur dioxide, about 31 mol percent water and about 34 mol percent extract oil. Operating at the above described conditions the overhead product from the extractive distillation was determined to comprise approximately 99.9 mol percent sulfur dioxide whereas the bottoms product from the column comprised about 3 mol percent sulfur dioxide, 10 mol percent water and about 87 mol percent extract oil. The composition of the intermediate product from the extractive distillation column was determined to comprise about 75.5 mol percent water, about 24 mol percent sulfolane, and about .5 mol percent sulfur dioxide. The separation of this mixture in the sulfolane stripper resulted in the production of an overhead product comprising about 99.4 mol percent water, and about .6 mol percent sulfur dioxide, and a bottoms product comprising about 93 mol percent sulfolane and about 7 mol percent water.

As a result, the greatest part of the water can be removed from this system thereby obviating the difficulty involved when excessive amounts of water are recycled to the hydrocarbon extraction zone. As is apparent from the specific example, only a nominal amount of water is recycled to the intermediate extract evaporator while essentially no water is recycled to the hydrocarbon extraction zone.

The substantially complete separation and recovery of the sulfur dioxide and extract oil present in the bottoms product from the drying column can be accomplished essentially as well as the mode of operation illustrated in FIGURE 3. The description of this mode of operation includes recitation of specific compositions and operating conditions that are intended only for illustrative purposes and should in no way be construed to define the extent of application of this embodiment.

The bottoms product removed from the drying column 40 and comprising about 35 mol percent sulfur dioxide, about 31 percent water, and about 34 mol percent extract oil is passed by way of pipe 67 through cooler 68 into admixture with a predetermined quantity of water introduced by pipe 69 and concentrated sulfolane introduced by pipe 70. The concentrated sulfolane stream comprises approximately 93 mol percent of sulfolane and about 7 mol percent water and is derived from a sulfolane stripping zone hereinafter detailed. This two phase mixture is then passed by way of pump 71 and pipe 72 to a quiescent settling zone 73 wherein substantially complete separation of the phases results. A less dense hydrocarbon phase is removed as overhead through pipe 74 and is recycled to the initial extract evaporator 25 in FIGURE 1. The more dense phase comprising sulfur dioxide, water and sulfolane being essentially free of hydrocarbon content is removed as bottoms product from the quiescent settler via pipe 75 and is passed by way of pump 76 and heater 77 to the extractive distillation column 78. The mixture is introduced to the extractive distillation column at an intermediate one of several vertically spaced serial stages and concentrated sulfolane recycled from the sulfolane stripper hereinafter detailed is introduced to the uppermost stage and is passed countercurrently through the column to effect a substantially complete separation of the water and sulfur dioxide. Substantially all of the sulfur dioxide in the system is removed by way of pipe 79 as overhead having, for instance, less than .01 weight percent water and is recycled to the intermediate extract evaporator 26 of FIGURE 1. Substantially all of the sulfolane and water in the feed column are removed by way of pipe 81 as a bottoms product comprising about 25 mol percent sulfolane and about 75 mol percent water, and only a trace of dissolved sulfur dioxide. Part of this bottoms product can be recycled by way of heater 87 and pipe 82 to control the temperature of the lower stage of the extraction distillation column as desired. The remainder of the bottoms product is passed by way of heater 83 to sulfolane stripper 84 wherein the water and sulfolane are separated at conditions which allow the substantially complete recovery of sulfolane as bottoms product. The overhead product comprising approximately 99 mol percent water is removed by way of pipe 85 at about one atmosphere pressure absolute and is passed by way of condenser 86, accumulator 88, and pump 89 to be either removed from the system by way of pipe 90 or to be recycled by way of pipe 69 into admixture with the bottoms product from drying column 40. The bottoms product from the sulfolane stripper is removed by way of pipe 91 at about 370° F. This concentrated sulfolane stream comprising approximately 93 mol percent sulfolane and about 7 percent water is pumped by pump 92 and is recycled in part by way of pipe 70 through cooler 96 into admixture with the bottoms product from drying column 40. The remainder of this concentrated sulfolane stream is passed by way of pipe 80 and cooler 80' to the uppermost stage of the extractive distillation column 78 wherein it is reused as selective solvent for the separation of sulfur dioxide from water. Provision is also made for recycling a part of the bottoms product from the sulfolane stripper by way of heater 94 and pipe 93 to the bottom of the sulfolane stripper to maintain the temperature therein at the desired level.

The mode of operation illustrated in this embodiment accomplishes essentially the same function as the operation described in FIGURE 2. Such operation essentially eliminates the loss of either extract oil or sulfur dioxide and in addition provides for their efficient separation and recycle to the hydrocarbon extraction operation in such purities that such recycle operations do not introduce any appreciable amounts of impurity into the extraction zone.

Figure 4:
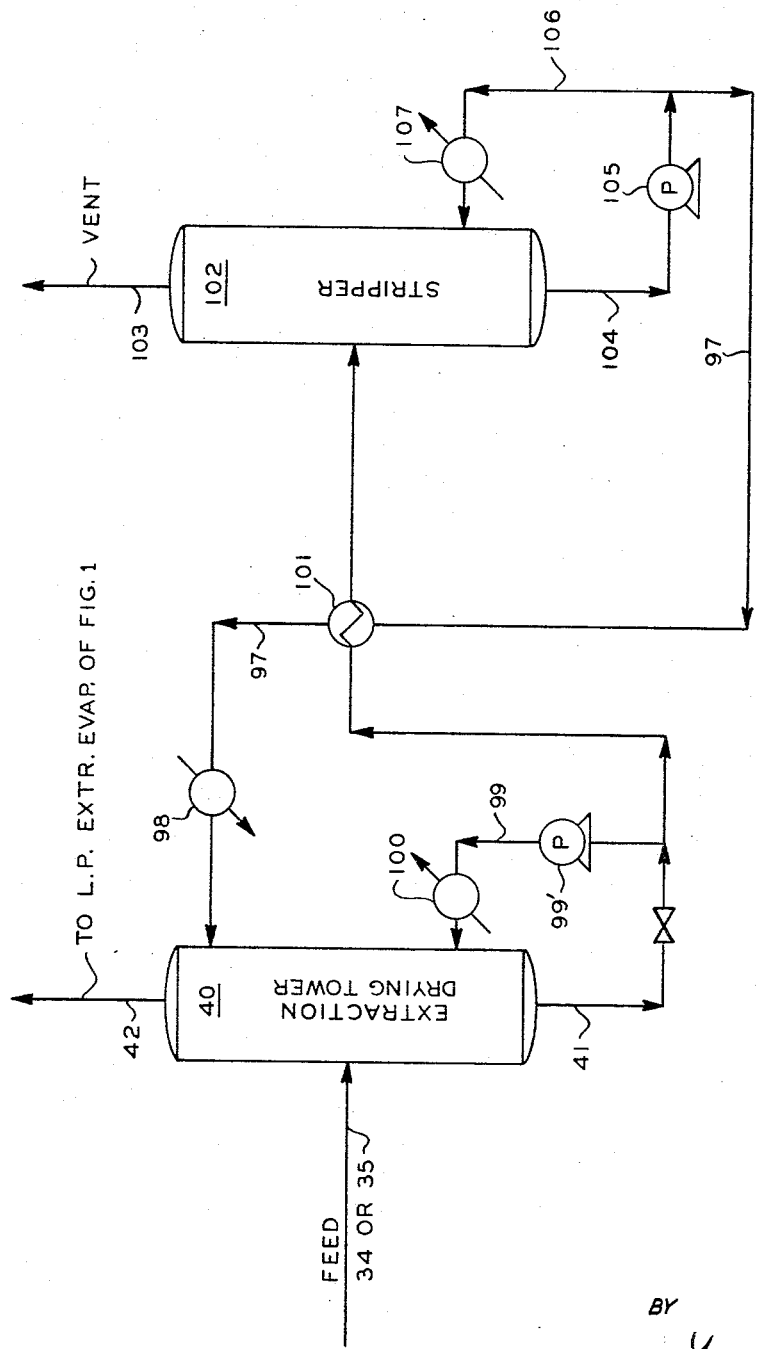
FIGURE 4 shows yet another embodiment of this invention in schematic form having a hydrocarbon selective extraction zone, primary solvent and product fractionation and recovery zones in closed cycle therewith, an extractive distillation zone, and a sulfolane recovery zone in closed cycle therewith.

Yet another embodiment of this invention which provides for the essentially complete recovery of sulfur dioxide in sufficient purity to allow its recycle to the hydrocarbon extraction zone is illustrated in FIGURE 4. In this embodiment, the drying column 40 of FIGURE 1 is refluxed with concentrated sulfolane introduced at the uppermost stage of the drying column by way of line 97 and heat exchanger 98. This mode of operation does not require the use of the extractive distillation column employed in the foregoing two embodiments, but at the same time it does not provide for the recovery and recycle of the extract oil present in the bottoms product from drying column.

Overhead product from the condenser pressure extract evaporator (or even the low pressure extract evaporator) is passed to an intermediate one of several vertically spaced serial stages in the drying column 40 which is operated at a bottoms temperature of about 350° F. and an overhead temperature of about 200° F. and pressure of about 110 p.s.i.a. Concentrated sulfolane recycled from a subsequent sulfolane stripper is introduced to the upper one of said vertically spaced serial stages through line 97 by way of heat exchanger 98 at a temperature of about 240° F. and is passed countercurrently through the column to effect the separation of sulfur dioxide from the water and extract oil present in the feed. This mode of operation results in extremely efficient resolution of sulfur dioxide and provides for the recovery of an overhead product removed by way of pipe 42 comprising at least 99.9 weight percent sulfur dioxide. This high purity sulfur dioxide stream is passed as recycle to the hydrocarbon extraction zone to FIGURE 1. The bottoms product from the drying column 40 is removed by way of pipe 41 and comprises about 16 weight percent sulfolane, about 8 weight percent water and about 76 weight percent extract oil. Part of this mixture can be recycled as desired by way of pump 99', pipe 99 and heater 100 to the lower stage of the drying column to maintain the temperature therein at the desired level. The remainder of this mixture is passed by way of heat exchanger 101 to sulfolane stripping column 102 wherein it is introduced at an intermediate one of several vertically spaced serial stages. This column is operated at an overhead pressure of about one atmosphere and a bottoms temperature of approximately 370° F. to provide for the resolution of sulfolane as bottoms product from extract oil, water and trace amounts of sulfur dioxides that are removed as overhead product through line 103 and are removed from the system. The highly concentrated sulfolane bottoms product is removed by way of pipe 104 and can be partially recycled using pump 105 by way of pipe 106 and heater 107 to the lower stage of the sulfolane stripping column to maintain the temperature therein at the desired level. The remainder of the concentrated sulfolane is passed by way of pipe 97 through heat exchanger 101 and cooler 98 to the upperstage of the drying column 40 to be reused as selected solvent for water and extract oil therein.

Recovery of the hydrocarbon material vented from the sulfolane column in the embodiment illustrated in FIGURE 4 can be readily accomplished by means of a relatively inexpensive modification to the process of that embodiment. The bottoms product from the sulfolane extractive distillation column 40 in FIGURE 4, comprising primarily sulfolane, water and oil can be admixed with a predetermined amount of water and passed to a quiescent settling zone wherein the hydrocarbon and water phases are allowed to separate. The less dense hydrocarbon phase comprising primarily the extract oil present in the bottoms product from the extractive distillation column is removed as overhead from the settling zone and can be recycled to one of the serial extract evaporation zones illustrated in FIGURE 1. In the presently preferred embodiment of this invention, the hydrocarbon material thus recovered is recycled to the extract evaporation zone from which the feed to the drying column in FIGURE 4 is derived. The more dense phase resolved in the quiescent settling zone comprises substantially all of the sulfolane and water present in the bottoms product from the extractive distillation column of FIGURE 4 in addition to the water admixed with the feed to said quiescent settling zone. This mixture can then be passed to a sulfolane fractionation zone wherein the sulfolane and water are resolved to provide for the recovery of a concentrated sulfolane bottoms product for recycle to the extractive distillation column of FIGURE 4. The overhead product from the sulfolane stripping zone comprises primarily water, part of which can be passed from the system while a desired amount of recycled water is passed into admixture with the feed to the aforementioned quiescent settling zone.

This latter described mode of operation provides for the recovery of the hydrocarbon extract oil that is otherwise vented from the sulfolane fractionation column 102 of FIGURE 4.

Where the hydrocarbon extract oil is separated from the feed to the sulfolane fractionation zone as above described, the operation of the said fractionation zone can be substantially the same as that described in accordance with the embodiment illustrated in FIGURE 3. These conditions need only be those required to obtain the desired degree of separation of water and sulfolane. In the presently preferred embodiment of this invention, the column is operated at an overhead pressure of approximately one atmosphere absolute and a bottoms product temperature of about 370° F. It is also preferred to heat the more dense phase from the quiescent settling zone to a temperature of about or slightly in excess of 300° F. before introducing it to the sulfolane fractionation zone. It is also desirable to cool the bottoms product from the extractive distillation column 40 of FIGURE 4 before its introduction to the quiescent settling zone for the purpose of promoting the more complete resolution of the hydrocarbon and water phases. In the presently preferred embodiment, the temperature of the feed to the quiescent settling zone can be about 90° F.

The examples and descriptions of operations are in no way intended to limit the scope or application of this invention but are disclosed only to illustrate the application of the process of this invention. The process of this invention as set forth hereinabove provides for the efficient resolution of mixtures of sulfur dioxide, water and hydrocarbon and the recovery of the several constituents in sufficient purity to provide for their general process applications while avoiding the problem of introducing detrimental quantities of impurities.

EXAMPLES

For FIGURE 2

Drier column 40:
   Bottom pressure, p.s.i.a. _____ 185
   Bottom temp., ° F. _____ 190
Extractive distillation column 45:
   Top pressure, p.s.i.a. _____ 30
   Top temp., ° F. _____ 120
   Tray 52 temp., ° F. _____ 260
   Bottom temp., ° F. _____ 350
Stripper 59:
   Pressure, p.s.i.a. _____ 15
   Bottom temp., ° F. _____ 375

Stream 41:                  Number mols/hr.
   $SO_2$ _____ 2.280
   $H_2O$ _____ 2.000
   Oil _____ 2.200
      Total _____ 6.480

Stream 51:
   $SO_2$ _____ 0.10
   $H_2O$ _____ 0.24
   Oil _____ 2.20
      Total _____ 2.54

Stream 56:
   $SO_2$ _____ 2.170
   $H_2O$ _____ 0.001
      Total _____ 2.171

Stream 53:
   $SO_2$ _____ 0.01
   $H_2O$ _____ 1.76
   Sulfolane _____ [1]0.56
      Total _____ 2.33

Stream 61:
   $SO_2$ _____ 0.010
   $H_2O$ _____ 1.759
      Total _____ 1.769

Stream 62:
   $H_2O$ _____ 0.01
   Sulfolane _____ [1]0.56
      Total _____ 0.57

[1] Sulfolane is 0.52, water is 0.04.

For FIGURE 3

Drier column 40:
   Bottom pressure, p.s.i.a. _____ 185
   Bottom temp., ° F. _____ 190
Settler 73:
   Pressure, p.s.i.a. _____ 35
   Temp., ° F. _____ 90
Extractive distillation column 78:
   Pressure, p.s.i.a. _____ 30
   Top temp., ° F. _____ 120
   Bottom temp., ° F. _____ 260
Stripper 84:
   Pressure, p.s.i.a. _____ 15
   Bottom temp., ° F. _____ 375

Stream 67:                  Number mols/hr.
   $SO_2$ _____ 2.280
   $H_2O$ _____ 2.000
   Oil _____ 2.200
      Total _____ 6.480

Stream 79:
   $SO_2$ _____ 2.170
   $H_2O$ _____ 0.001
      Total _____ 2.171

Stream 74:
   $SO_2$ _____ 0.110
   $H_2O$ _____ 0.280
   Oil _____ 2.200
      Total _____ 2.590

For FIGURE 4

Drying Tower 40:
   Pressure, p.s.i.a. _____ 110
   Top temp., ° F. _____ 200
   Bottom temp., ° F. _____ 350
Stripper 102:
   Pressure, p.s.i.a. _____ 15
   Bottom temp., ° F. _____ 375

Stream 34:                  Number mols/hr.
   $SO_2$ _____ 874
   $H_2O$ _____ 4
   Oil _____ 2
      Total _____ 880

Stream 42:
   $SO_2$ _____ 873.99
   $H_2O$ _____ 1

Stream 97:
   Sulfolane _____ 0.5
   $H_2O$ _____ ----

Stream 103:
   $SO_2$ _____ 0.01
   $H_2O$ _____ 3.00
   Oil _____ [1] 350

[1] Reported as pounds/hour.

Reasonable variation and modification are possible within the scope of the foregoing disclosure, and the drawings and the appended claims to this invention the essence of which is that a method is provided for the efficient resolution of mixtures of sulfur dioxide, water and hydrocarbon oils wherein the sulfur dioxide and hydrocarbon oils are recovered in sufficiently high purity for their general process applications to operations requiring the substantial absence of water.

We claim:

1. A process for removing water from a feed mixture of the same with sulfur dioxide and hydrocarbon oil which process comprises:

(a) treating said mixture with a sulfolane at extractive distillation condition to produce a first overhead product comprising essentially sulfur dioxide, a first bottoms product comprising hydrocarbon oil as a major part thereof, and an intermediate product comprising predominantly sulfolane and water;
(b) fractionating said intermediate product to produce a second overhead product comprising essentially water and a concentrated sulfolane bottoms product; and
(c) passing said concentrated sulfolane bottoms product as recycle to said extractive distillation operation.

2. The process of claim 1 wherein said feed mixture is the bottoms product from the sulfur dioxide drying tower in a hydrocarbon extraction process which latter process comprises:
(a) contacting a mixture of saturated, aromatic and unsaturated hydrocarbons and minor amounts of water with liquid sulfur dioxide at extraction condition to produce a raffinate phase and an extract phase, said raffinate phase comprising primarily saturated hydrocarbons and said extract phase comprising sulfur dioxide, water and unsaturated hydrocarbons;
(b) fractionating said extract phase to produce an overhead product and a bottoms product, said overhead product comprising sulfur dioxide, water and hydrocarbon; said bottoms product comprising primarily unsaturated and aromatic hydrocarbons;
(c) fractionating at least a part of said overhead product from said extract phase in a sulfur dioxide drying zone to produce a concentrated sulfur dioxide overhead product and a mixed bottoms product comprising sulfur dioxide, water and saturated hydrocarbons;
(d) passing the remainder of said overhead product from said extract phase as recycle to said extraction zone;
(e) passing said concentrated sulfur dioxide overhead product to said extraction zone as recycle; and
(f) employing said mixed bottoms product as said feed mixture to the process of claim 1.

3. A process for drying a feed stream comprising sulfur dioxide, water and extract oil which process comprises:
(a) admixing sulfolane and water recycled from a fractionation zone hereinafter detailed with said stream to form a two-phase mixture;
(b) passing said mixture to a quiescent settling zone wherein are formed a less dense phase comprising primarily extract hydrocarbon and a more dense phase comprising primarily water, sulfur dioxide and sulfolane;
(c) removing and collecting said less dense phase;
(d) contacting said more dense phase with additional sulfolane at extractive distillation conditions to produce a first overhead product and a first bottoms product, said first overhead product comprising primarily sulfur dioxide, said first bottoms product comprising primarily sulfolane and water;
(e) treating said first bottoms product at fractionation conditions to produce a second overhead product comprising primarily water, and a second bottoms product comprising primarily sulfolane;
(f) recycling part of said second overhead product into admixture with said feed stream and removing the remainder from the system; and
(g) recycling a portion of said second bottoms product into admixture with said feed stream and recycling the remainder thereof to said extractive distillation operation.

4. In a process for separating a mixture of saturated, aromatic and unsaturated hydrocarbons comprising:
(a) extracting said mixture with sulfur dioxide to form raffinate and extract phases;
(b) fractionating said extract phase to produce a first overhead product and a first bottoms product, the improvement comprising:
(c) extractively distilling at least a portion of said first overhead product with sulfolane to produce a second overhead product comprising primarily sulfur dioxide and a second bottoms product;
(d) fractionating said second bottoms product to remove water as overhead and concentrated sulfolane as bottoms product;
(e) recycling said second overhead product to said extraction operation; and
(f) recycling said concentrated sulfolane to said extractive distillation operation.

5. The process of claim 1 wherein:
(a) said feed mixture is treated at said extractive distillation conditions in an extractive distillation zone comprising several vertically spaced serial stages;
(b) said feed mixture is introduced at a first intermediate stage;
(c) said intermediate product is removed from a second intermediate stage above said first intermediate stage;
(d) said concentrated sulfolane bottoms product is recycled to the uppermost stage;
(e) said intermediate product is fractionated in a stripping zone comprising several vertically spaced serial stages;
(f) said intermediate product is introduced at an upper one of stages in said stripping zone; and
(g) steam is introduced at a lower stage to provide heat to said stripping zone.

6. The process of claim 5 wherein
(a) the temperature and pressure at said upper stage of said extractive distillation zone are respectively about 120° F. and 30 p.s.i.a.;
(b) the temperature of said second intermediate stage is about 260° F.;
(c) the temperature of the lowermost of said serial stages in said extractive distillation zone is about 350° F.;
(d) the pressure of the uppermost stage in said stripping zone is about one atmosphere; and
(e) the temperature of the lowermost stage of said stripping zone is about 375° F.

7. The process of claim 1 wherein said first overhead product consists essentially of sulfur dioxide, said concentrated sulfolane bottoms product comprises less than 10 mole percent water, and said second overhead product comprises essentially water.

8. The process of claim 3 wherein
(a) said more dense phase is contacted with said sulfolane at said extractive distillation conditions in an extractive distillation zone comprising several vertically spaced serial stages;
(b) said more dense phase is introduced to said extractive distillation zone at an intermediate one of said serial stages;
(c) said first bottoms product is treated at said fractionation conditions in a stripping zone comprising several vertically spaced serial stages;
(d) said first bottoms product is introduced to said stripping zone at an upper one of said serial stages;
(e) said second bottoms product comprising primarily sulfolane is recycled to an upper stage of said extractive distillation zone; and
(f) steam is introduced at a lower stage of said stripping zone to provide heat thereto.

9. The process of claim 8 wherein
(a) the temperature and the pressure at said upper stage of said extractive distillation zone are respectively about 120° F. and 30 p.s.i.a.;
(b) the temperature of said lower stage of said extractive distillation zone is about 260° F.;
(c) the pressure of said upper stage of said stripping zone is about one atmosphere absolute; and
(d) the temperature at said lower stage of said stripping zone is about 375° F.

10. The process of claim 4 wherein
 (a) said extractive distillation operations is conducted in a zone comprising several vertically spaced serial stages, wherein the temperature of the uppermost stage is about 200° F. and wherein the temperature of the lowermost stage is about 350° F.;
 (b) said portion of said first overhead product is introduced to said zone at an intermediate one of said serial stages;
 (c) said recycled concentrated sulfolane is introduced to an upper one of said serial stages; and
 (d) said second bottoms product is fractionated in several vertically spaced serial stages wherein the pressure of the uppermost stage is about one atmosphere absolute and the temperature of the lowermost stage is about 380° F.

11. The process of claim 4 wherein
 (a) said second bottoms product is cooled and admixed with a sufficient amount of water to produce a two-phase mixture;
 (b) said two-phase mixture is separated to recover a less dense hydrocarbon phase and a more dense phase comprising primarily sulfolane and water;
 (c) said more dense phase is fractionated to produce water as overhead product and a concentrated sulfolane bottoms product; and
 (d) said concentrated sulfolane bottoms product is recycled to said extractive distillation operation.

References Cited

UNITED STATES PATENTS 2,777,800   1/1957   Mitchell et al. _____ 208—321

DELBERT E. GANTZ, *Primary Examiner.*

H. LEVINE, *Assistant Examiner.*